United States Patent
Lin

(10) Patent No.: US 9,257,857 B2
(45) Date of Patent: Feb. 9, 2016

(54) CABLE POSITIONING DEVICE AND CHARGER USING SAME

(71) Applicant: K.S. TERMINALS INC., Changhua County (TW)

(72) Inventor: Chang-Yi Lin, Changhua County (TW)

(73) Assignee: K. S. TERMINALS INC., Changhua County (TW)

( * ) Notice: Subject to any disclaimer, the term of this patent is extended or adjusted under 35 U.S.C. 154(b) by 247 days.

(21) Appl. No.: 14/010,682

(22) Filed: Aug. 27, 2013

(65) Prior Publication Data

US 2014/0354216 A1    Dec. 4, 2014

(30) Foreign Application Priority Data

May 30, 2013  (TW) .............................. 102119164 A

(51) Int. Cl.
| | |
|---|---|
| *H02J 7/00* | (2006.01) |
| *H02G 15/007* | (2006.01) |
| *H01R 13/56* | (2006.01) |
| *B60L 11/18* | (2006.01) |
| *H01R 13/58* | (2006.01) |

(52) U.S. Cl.
CPC ........... *H02J 7/0042* (2013.01); *B60L 11/1818* (2013.01); *H01R 13/565* (2013.01); *H02G 15/007* (2013.01); *H01R 13/5808* (2013.01)

(58) Field of Classification Search
USPC ........... 320/107, 108, 109; 385/139; 439/813, 439/470
See application file for complete search history.

(56) References Cited

U.S. PATENT DOCUMENTS

| | | | |
|---|---|---|---|
| 4,394,531 A | | 7/1983 | Delabie |
| 6,027,382 A | * | 2/2000 | Reindl et al. ................... 439/793 |
| 2013/0028569 A1 | * | 1/2013 | Kempeneers et al. ......... 385/139 |
| 2013/0075127 A1 | * | 3/2013 | Kwak .............................. 174/60 |

* cited by examiner

*Primary Examiner* — Brian Ngo
(74) *Attorney, Agent, or Firm* — Bacon & Thomas, PLLC

(57) ABSTRACT

A cable positioning device and a charger using the cable positioning device is disclosed to include a cable positioning device mounted in a mounting structure inside the charger to secure a cable. The cable positioning device includes a polygonal column that can be forced by an external pressure to deform non-elastically and to further tightly fit the cable, having at least one surface thereof abutted against an inner wall of the mounting structure in the axial direction of the cable to prevent displacement of the cable positioning device and the internal electric wires of the cable due to accidental twisting of the external part of the cable, improving the cable installation efficiency.

8 Claims, 4 Drawing Sheets

CABLE POSITIONING DEVICE AND CHARGER USING SAME

BACKGROUND OF THE INVENTION

1. Field of the Invention

The present invention relates to charger technology and more particularly, to a cable positioning device for use in a charger to secure a cable, preventing the cable from rotation due to twisting or rotation of an external part of the cable of the charger upon movement of the charger, and improving cable installation efficiency.

2. Description of the Related Art

Cables are known as essential components of many machines for use in transmitting electrical signals. To enhance signal transmission stability, U.S. Pat. No. 4,394,531 discloses a device for reducing vibration of a transmission line, entitled "Transmission line assembly including means for reducing vibrations and method of making same". This design includes an outer tubular sheath having an inner surface and a plurality of protruding wall members mounted along the inner surface of the tubular sheath securing a transmission line by the friction of the abutment between the protruding wall members and the transmission line and lessening the influence of the environmental vibrations. However, the protruding wall members merely use the aforesaid friction to secure the transmission line which is not sufficient to avoid the rotation of the transmission line.

Further, with the development of electric vehicle technology, the market demand for charger keeps increasing. For enabling the plug of a charger to withstand thousands of times of plugging and unplugging operations, the structural design of the charger must enable every component part to withstand a certain degree of stretching force, preventing disconnection between the conducting terminals and the welding points of the cable. Besides, in order to facilitate user operation, the connector body and grip of the charger are designed to curve at a predetermined angle. Therefore, the cable installation worker needs to use an elastic rubber packing member to attach the periphery of the cable and then force the cable with the attached elastic rubber packing member into the inside of the charger along the curving direction of the connector body and the grip, avoiding rotation of the cable in the charger. However, this measure greatly affects the cable installation efficiency.

SUMMARY OF THE INVENTION

The present invention has been accomplished under the circumstances in view. It is the main object of the present invention to provide a cable positioning device for charger, which prevents disconnection between the conducting terminals and the welding points of the cable due to twisting of the cable after a long use of the charger.

It is another object of the present invention to provide a cable positioning device for charger, which greatly improves the cable installation efficiency.

To achieve these and other objects of the present invention, a cable positioning device of the invention is provided for mounting in a mounting structure of a charger to tightly fit a cable. The cable positioning device comprises a column having a polygonal cross section, and a passage defined within the column for the insertion of the cable. The column can be forced by an external pressure to deform non-elastically, and to further tightly fit the cable. Further, the column has at least one peripheral surface for abutment against one respective inner wall of the mounting structure.

Preferably, the cable positioning device is made of metal. Thus, a cable installation worker can use a tool to crimp the cable positioning device, causing the cable positioning device to deform non-elastically and to further tightly fit the cable. Further, the connector body of the charger has multiple protruding inner walls for abutment against multiple peripheral walls of the cable positioning device. When a user uses the charger, the cable is tightly fitted by the cable positioning device and the attaching force produced from the abutment between the peripheral surfaces of the column of the cable positioning device and the inner walls of the mounting structure effectively prohibits the cable from rotation, preventing disconnection between the conducting terminals and the welding points of the electrical wires of the cable, and prolonging the lifespan of the charger.

Further, preferably, the cable positioning device comprises an abutment portion outwardly extended from one end surface of the column. The cross-sectional area of the abutment portion is larger than the column so that the abutment portion can abut against the inner walls of the connector body in the axial direction of the cable to prevent axial displacement of the internal electric wires of the cable due to the effects of the gravity of the cable.

Other advantages and features of the present invention will be fully understood by reference to the following specification in conjunction with the accompanying drawings, in which like reference signs denote like components of structure.

DETAILED DESCRIPTION OF THE INVENTION

In order to better understand the features of the present invention, a preferred embodiment is set forth hereby with reference to the annexed drawings.

Figure 1:
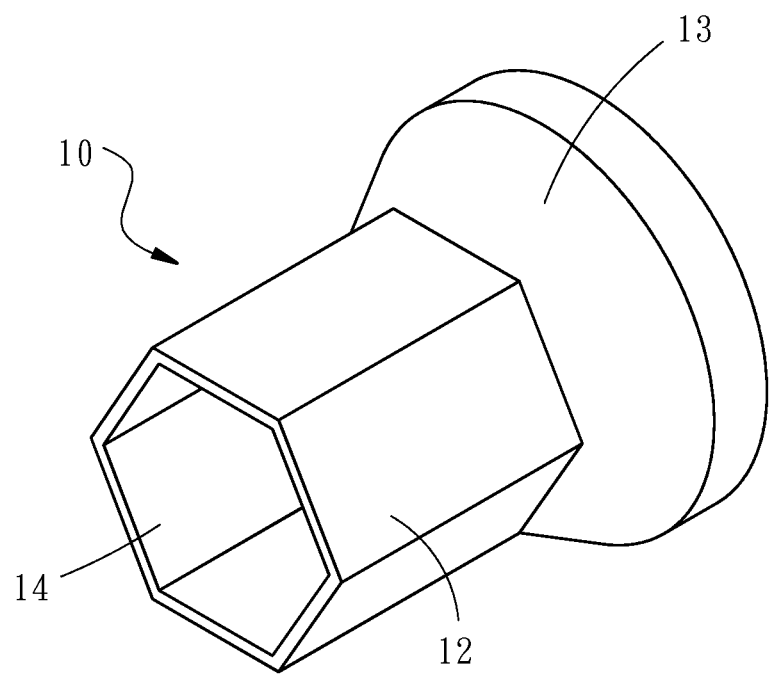
FIG. 1 is a perspective view of a cable positioning device in accordance with a preferred embodiment of the present invention.
Figure 2:
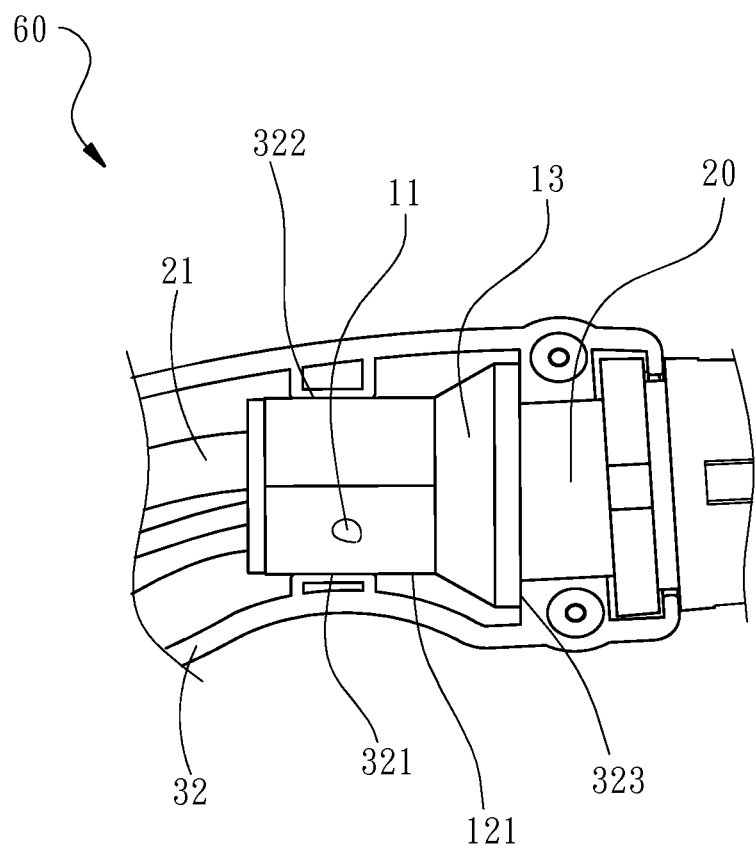
FIG. 2 is a schematic drawing of the preferred embodiment of the present invention, illustrating the mounting structure and the cable positioning device installed therein.
Figure 3:
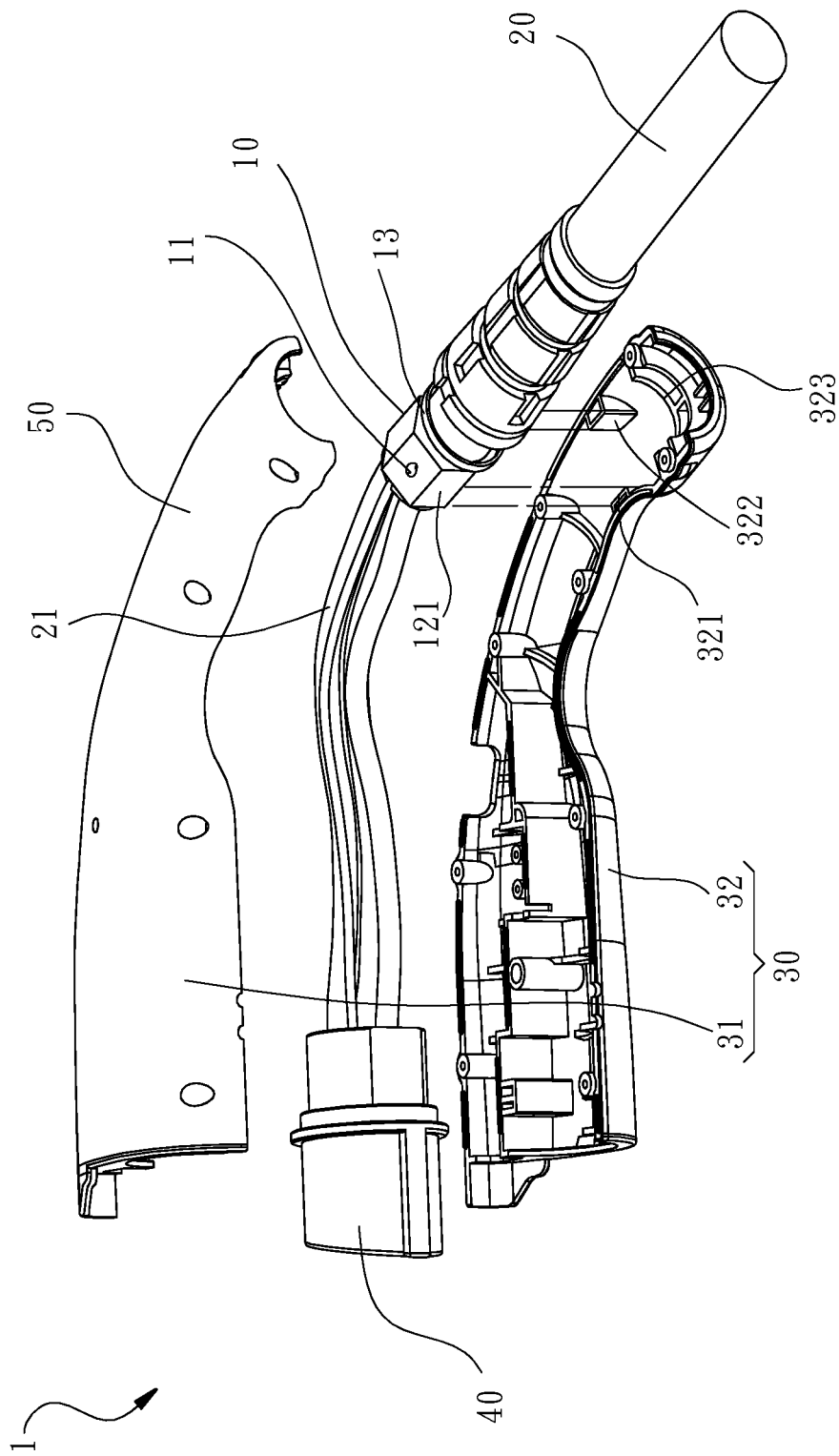
FIG. 3 is an exploded view of the charger in accordance with the preferred embodiment of the present invention.
Figure 4:
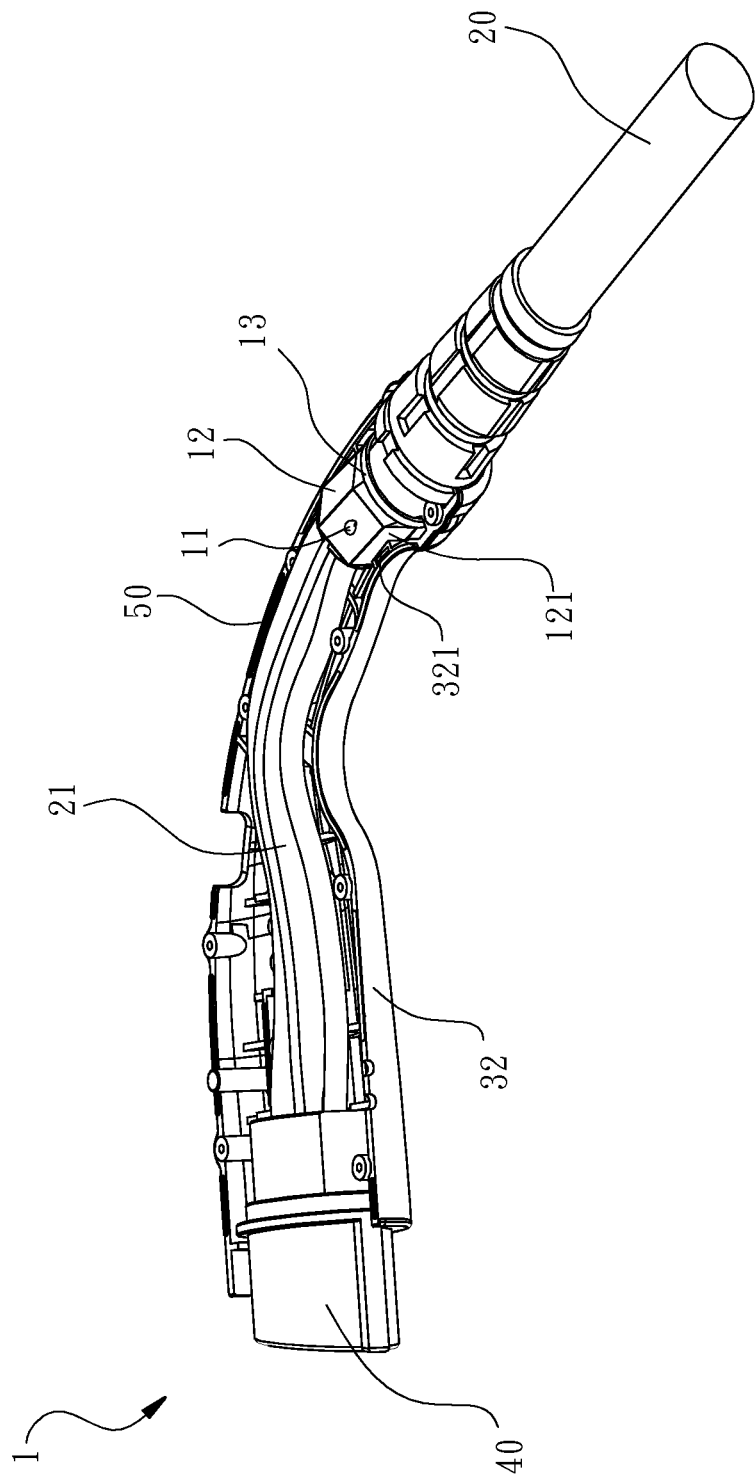
FIG. 4 is a perspective view of the charger in accordance with the preferred embodiment of the present invention (the upper shell of the connector body excluded).

Referring to FIGS. 1-4, a charger 1 in accordance with the present invention is shown. The charger 1 comprises a connector body 30, a grip 50 formed in the connector body 30, a mounting structure 60 formed integrally inside the grip 50, a cable 20 inserted through the grip 50, and a cable positioning device 10 mounted in the mounting structure 60 for securing the cable 20. The cable positioning device 10 comprises a column 12 having a polygonal cross section, a passage 14 defined within the column 12 for the insertion of the cable 20. The column 12 can be forced to deform non-elastically and to further tightly fit the cable 20. Further, the column 12 has at least one peripheral surface abutted against an inside wall of the mounting structure 60.

The details of the relationship between components of the preferred embodiment of the present invention are described hereinafter:

In this embodiment, the connector body 30 of the charger 1 consists of an upper shell 31 and a bottom shell 32 that are assembled by abutting joint installation. The upper shell 31 and the bottom shell 32 define therein an accommodation space and multiple inside walls for accommodating and securing internal components of the charger 1. The connector body 30 has its one end equipped with a plug 40, and its other end terminating in the grip 50. In order to meet ergonomic concerns and user habits, the grip 50 is designed to curve downwardly from the connector body 30 at a predetermined angle.

The column 12 is a hollow hexagonal column made of metal, for example, aluminum. The cross-sectional area of the internal hollow part of the column 12 is slightly larger than the cable 20 so that the cable 20 can be inserted through the column 12. After insertion of the cable 20 through the column 12, the cable installation worker can use a tool to exert a pressure to at least one side of the column 12, causing the column 12 to deform inwardly and non-elastically and to further form a dent 11 and tightly fit the cable 20. The column 12 comprises two abutment surfaces 121 respectively abutted against a first inner wall 321 and a second inner wall 322 of the mounting structure 60 to attach the cable positioning device 10 in position, prohibiting the cable positioning device 10 and the internal part of the cable 20 from rotation upon twisting or rotation of an external part of the cable 20 during operation of the charger. The number of the abutment surfaces is not a limitation. The column 12 can be designed having only one single abutment surface abutted against one respective inner wall of the mounting structure 60 to achieve the same effect of attaching the cable positioning device 10. Further, the column 12 can be alternatively designed in the form of a quadrilateral column or any other equivalent structure.

In this embodiment, the cable positioning device 10 has its one end outwardly extended to form a abutment portion 13 for abutting against the mounting structure 60. The area enclosed by the border edge of the abutment portion 13 is larger than the cross-sectional area of the column 12, and therefore the abutment portion 13 can be abutted against the mounting structure 60 in the axial direction of the cable 20, preventing axial displacement of the internal electric wires 21 of the cable 20 or disconnection between the internal electric wires 21 and its conducting terminals (not shown) due to the effects of the gravity of the cable 20.

It is worth mentioning that the abutment portion 13 is designed simply to provide an auxiliary function but not a requisite element. Simply abutting the end surface of the column 12 against a third inner wall 323 of the mounting structure 60 can achieve the function of preventing the cable 20 from displacement.

Based on the aforesaid structure, the cable installation worker simply needs to attach and affix the cable positioning device 10 to the periphery of the cable 20 and then to mount the cable 20 and the cable positioning device 10 firmly in the mounting structure 60, improving the installation efficiency.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cable positioning device for securing a cable in a mounting structure, characterized in that the cable positioning device comprising a column having a polygonal cross section, a passage defined within said column for the insertion of said cable, said column being forcible by an external force to deform non-elastically and to further tightly fit said cable, said column comprising at least one peripheral surface abutted against an inner wall of said mounting structure, wherein said column has one end thereof extending outwards to form an abutment portion, the area surrounded by the border edge of said abutment portion being larger than the cross-sectional area of said column.

2. The cable positioning device as claimed in claim 1, wherein said column is a quadrilateral column.

3. The cable positioning device as claimed in claim 1, wherein said column is a hexagonal column.

4. The cable positioning device as claimed in claim 1, wherein said column is made of aluminum.

5. A charger, comprising a connector body, a grip connected to said connector body, a mounting structure formed integrally in said connector body, and a cable inserted through said grip, characterized in that the charger further comprises a cable positioning device as claimed in claim 1, said cable positioning device being mounted in said mounting structure to tightly fit said cable.

6. The charger as claimed in claim 5, wherein said column is a quadrilateral column.

7. The charger as claimed in claim 5, wherein said column is a hexagonal column.

8. The charger as claimed in claim 5, wherein said column is made of aluminum.

* * * * *